Patented Nov. 22, 1949

2,488,557

UNITED STATES PATENT OFFICE 2,488,557

PREPARATION OF 2-NONENOIC ACID

William Jennings Peppel, Lodi, N. J., assignor to The Givaudan Corporation, a corporation of New Jersey No Drawing. Application February 15, 1947, Serial No. 728,954

5 Claims. (Cl. 260—405.6)

This invention relates to a process for preparing 2-nonenoic acid, and more particularly, to a process involving the isomerization of 3-nonenoic acid to 2-nonenoic acid by treatment of the former with a concentrated aqueous solution of a hydroxide of an alkali metal.

Most of the practical procedures for the preparation of nonenoic acid normally result in greatly preponderant amounts of the beta, gamma-unsaturated nonenoic acid (3-nonenoic acid) compared to the alpha, beta-unsaturated nonenoic acid (2-nonenoic acid). For certain purposes the latter material is required, as for example, in the preparation of certain odoriferous materials. Consequently, a commercially-useful and technically simple process for converting the 3-nonenoic acid into the 2-nonenoic acid is desirable.

My present invention provides such a process. I attain the conversion of 3-nonenoic acid to 2-nonenoic acid by transforming the starting acid to an alkali metal salt thereof by means of a suitably concentrated aqueous solution of a hydroxide of an alkali metal, heating the resulting heterogeneous mixture of solid and liquid until a substantial amount of the alkali metal salt of 3-nonenoic acid has been converted to the corresponding salt of 2-nonenoic acid, separating the solid phase from the liquid phase, forming the free acids and separating the resulting mixture of 2-nonenoic acid and 3-nonenoic acid in accordance with known procedures for separating an alpha, beta-unsaturated acid from a beta, gamma-unsaturated acid.

The 3-nonenoic acid used in my process may be prepared in known manner. It may be in a pure state or mixed with other substances, for example, with 2-nonenoic acid as is the case in some processes for the preparation of 3-nonenoic acid.

The alkali metal hydroxides which are contemplated for use in the instant process are the hydroxides of sodium potassium, or lithium. They are used in the form of aqueous solutions. The amount of hydroxide present in the solution should be sufficiently in excess to result in a substantial amount of the alkali metal salts (formed by action of the hydroxide on the unsaturated acid) being insoluble in the liquid. Dilute solutions of alkali do not yield such heterogeneous mixtures which form a distinct characteristic of my process, and hence the use of such solutions are not contemplated by my invention. I have found that satisfactory results are obtained with aqueous solutions containing between about 40 and about 65 per cent of alkali metal hydroxides, but for best results concentrations between 50 and 60 per cent are preferred.

The temperature at which the heterogeneous mixture formed by action of concentrated aqueous solutions of alkali metal hydroxides on 3-nonenoic acid may be heated to isomerize the salt to that of 2-nonenoic acid and may vary within limits. Since the isomerization reaction occurs slowly under 100° C., it is preferred to conduct the reaction above this temperature, usually at the temperature of the refluxing mixture. Temperatures above about 175° C. may be employed but at such temperatures there is danger of decomposition, and hence such temperatures are not recommended. Temperatures between about 140° C. and about 160° C. are specially recommended, as excellent results are obtainable thereby.

Sufficiently high temperatures for carrying out the isomerization can usually be obtained by heating the mixtures to refluxing temperatures. However, higher temperatures may be employed by operating under superatmospheric pressure, without departing from the spirit of this invention.

Though the process may be conducted at superatmospheric pressures without departing from the spirit of this invention, it is nevertheless preferred to operate under atmospheric pressure, because of well-known chemical engineering and processing considerations.

The time during which the isomerization reaction is conducted may vary, depending upon the concentration of alkali metal hydroxide employed and the temperature at which the reaction is conducted. Though there is no well-defined relationship it may be said that the time will vary inversely with these two factors, i. e., when the concentration or the temperature is increased the time required to isomerize a substantial amount of the 3-nonenoic acid salt to the 2-nonenoic acid salt will be decreased. Generally speaking, the isomerization reaction requires from about 8 to about 24 hours to reach maximum conversion of the one isomer to the other, periods of about 12 hours being found in most cases to give the desired results.

One of the advantages of my process is that although the alkali metal salts of 2- and 3-nonenoic acids are substantially insoluble in the concentrated aqueous alkali, the isomerization reaction neverthless takes place at a satisfactory rate. As a result, it is an easy matter to separate the salt mixture from the liquid, using known means, such as filtration. As a consequence, most of the large excess of alkali employed in the reaction can be recovered and utilized again. On the other hand, if a less concentrated solution of alkali were employed, in which the alkali metal salts dissolved, it would be necessary to neutralize the entire quantity of alkali to recover the free acids. In short, my process permits a saving in alkali and acid to be effected, and considerably reduces the volumes of material that need be handled.

The applicability of concentrated aqueous alkali for the isomerization of 3-nonenoic acid to 2-nonenoic acid is fortunate, since a high concentration of alkali suppresses certain side reactions, such as the formation of 2-hydroxynonenoic acid.

The isomerization step in my process does not result in a 100 per cent conversion to the salt of 2-nonenoic acid. I have found that the maximum conversion results in a mixture containing about 82 per cent of 2-nonenoic acid salt and 18 per cent of 3-nonenoic acid salt. This will be understood by organic chemists as indicating an equilibrium condition, the isomerization being of such a nature that it apparently does not go to completion.

The mixture of alkali metal salts of 2-nonenoic acid and 3-nonenoic acid may be separated in known manner. For example, the mixture may first be neutralized with a mineral acid, such as hydrochloric acid, to form free acids. The mixture of acids may then be treated with sulfuric acid (e. g. of 93 per cent strength). This converts 3-nonenoic acid to a lactone but does not alter the 2-nonenoic acid. The unchanged 2-nonenoic acid may be separated by extraction with dilute alkali hydroxide solution and regenerated by making the solution acid to Congo red with sulfuric acid or hydrochloric acid.

In order more fully to clarify this invention the following example is given by way of illustration.

930 grams of potassium hydroxide was dissolved in 750 grams of water at such a rate that boiling was avoided. The cooled solution had a specific gravity of 1.548. 234 grams of 3-nonenoic acid was added to the solution slowly, with stirring. When all the acid had been added, the charge which was a heterogeneous mixture of solid and liquid, was agitated and heated under reflux at atmospheric pressure to 145° C. to 150° C. and this temperature range was maintained for 12 hours.

The charge was then cooled to room temperature (25° C.) and run out on to a 100 mesh copper gauge filter and filtered under suction. About 70 to 75 per cent of the original potassium hydroxide solution was recovered. It had a specific gravity of 1.504 and may be reused, preferably after it has been adjusted to the original strength.

The thick paste, consisting mainly of the potassium salt of the isomerized acid, was transferred to another vessel using water to clean up the filter. An excess of 30% aqueous hydrochloric acid (350 ml.) was added to the paste until the contents were acid to Congo red, thereby forming free acid. The upper oil layer was then mixed with an equal volume of benzene, separated from the aqueous layer, washed with water and distilled. After benzene and a small forerun had distilled, 206 grams of a fraction distilling within the range of 122° C. and 135° C. at a pressure of 3 mm. of mercury were obtained. This material has an index of refraction, $n_D^{20} = 1.456$, from which the composition was calculated to be about 82 per cent of 2-nonenoic acid and 18 per cent of 3-nonenoic acid.

The mixture of acids was placed in a vessel equipped with a stirrer and 200 grams of 93 per cent aqueous sulfuric acid was added slowly under stirring, so that the temperature did not rise above 20° C. to 25° C. The homogeneous mixture was allowed to stand for 24 hours.

The mixture was then run into 400 grams of ice and the oily layer obtained was mixed with an equal volume of benzene. The benzene solution was separated and transferred to a vessel equipped with a stirrer. A 5 per cent aqueous sodium hydroxide solution was slowly added with stirring until slight alkalinity to phenolphthalein had been attained. About 900 grams of caustic solution were required. Agitation was stopped and the layers were separated. The benzene layer was washed with a little water and then distilled to recover the 3-nonalactone, boiling point 101° C.–102° C./3 mm. The aqueous layer was made acid to Congo red with 50 per cent aqueous sulfuric acid and the resulting upper oily layer was mixed with an equal volume of benzene. The benzene solution was then distilled and a fraction, boiling between 118° C. and 132° C./2 mm. and weighing 153 grams, was obtained.

The foregoing illustrates the practice of this invention, which however, is not to be limited thereby but is to be construed as broadly as permissible in view of the prior art and limited solely by the appended claims.

I claim:

1. A process for producing 2-nonenoic acid which comprises treating a material selected from the group consisting of 3-nonenoic acid and a mixture of 2-nonenoic acid and 3-nonenoic acid with an aqueous solution of an alkali metal hydroxide having about 40 to about 65 per cent of alkali metal hydroxide and in an amount in excess of that theoretically required to form the alkali metal salt of all of the nonenoic acid present so that a substantial amount of the resulting alkali metal salt of the nonenoic acid is insoluble in the liquid, heating the heterogeneous mixture to an elevated temperature until a substantial amount of the salt of 3-nonenoic acid has been converted to the corresponding salt of 2-nonenoic acid, separating the solid phase from the liquid phase, neutralizing the solid material so as to form free acid, and separating the resulting mixture of 2-nonenoic acid and 3-nonenoic acid according to known means for separating an alpha,beta-unsaturated acid from a beta,gamma-unsaturated acid.

2. The process of claim 1 wherein an aqueous potassium hydroxide solution having a strength between about forty and about 65 per cent is used and the isomerization reaction is conducted within the range of about 140° C. to about 160° C.

3. The process of claim 2 wherein the isomerization reaction is conducted until a mixture containing about 82 per cent by weight of the potassium salt of 2-nonenoic acid and about 18 per cent by weight of the potassium salt of 3-nonenoic acid is obtained.

4. The process of claim 3, wherein 3-nonenoic acid is the starting acid.

5. The process of claim 3, wherein a mixture of 2-nonenoic acid and 3-nonenoic acid is the starting material.

WILLIAM JENNINGS PEPPEL.

REFERENCES CITED

The following references are of record in the file of this patent:

Spitzer et al., American Paint Journ., Dec. 15, pages 18, 20, 22–23, 26, 28 and Dec. 22, pages 68–72, 1941.

Bradley et al., Ind. Eng. Chem. 34, 237–242 (1942).